(12) United States Patent
Yao

(10) Patent No.: US 6,424,984 B1
(45) Date of Patent: Jul. 23, 2002

(54) MULTIFUNCTION ELECTRONIC BOOKMARK

(75) Inventor: Zhi Hua Yao, Brooklyn, NY (US)

(73) Assignee: Stonia New York Corp., New York, NY (US)

( * ) Notice: Subject to any disclaimer, the term of this patent is extended or adjusted under 35 U.S.C. 154(b) by 43 days.

(21) Appl. No.: 09/675,405

(22) Filed: Sep. 29, 2000

(51) Int. Cl.⁷ ................................................ G06F 15/16
(52) U.S. Cl. ...................................................... 708/105
(58) Field of Search .................................. 708/105, 142

(56) References Cited

U.S. PATENT DOCUMENTS

| | | | |
|---|---|---|---|
| 4,481,607 A | * 11/1984 | Kobayashi et al. | ............ 704/7 |
| 5,073,054 A | 12/1991 | McDowell | |
| 5,199,104 A | 3/1993 | Hirayama | |
| 5,365,434 A | * 11/1994 | Figliuzzi | ..................... 345/854 |
| 5,408,950 A | * 4/1995 | Porto | ........................... 281/42 |
| 5,915,873 A | * 6/1999 | Karlis | ........................... 402/79 |

* cited by examiner

Primary Examiner—Tan V. Mai
(74) Attorney, Agent, or Firm—Gottlieb, Rackman & Reisman, P.C.

(57) ABSTRACT

An electronic bookmark device that can perform multiple functions. The device has a display housing and a thin keypad. The display housing and keypad are sized and connected so that the display housing can rest on the edges of the pages of a book while the keypad is placed between two pages of a closed book. The keys of the keypad are incorporated onto the surface of the keypad such that they do not raise above the general surface of the keypad. The keys of the keypad include multiple function keys that select among dictionary, clock, calculator, schedule/alarm and help features. Additional keys are used for data input including cursor keys, a QWERTY arrangement of alphanumeric keys, and auxiliary keys. Several keys serve dual purposes for use with the various functions of the device.

10 Claims, 3 Drawing Sheets

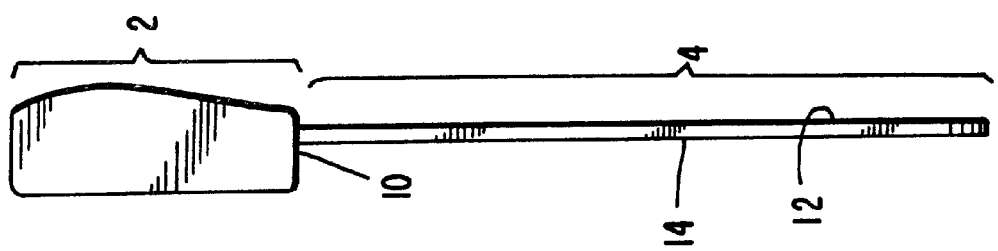
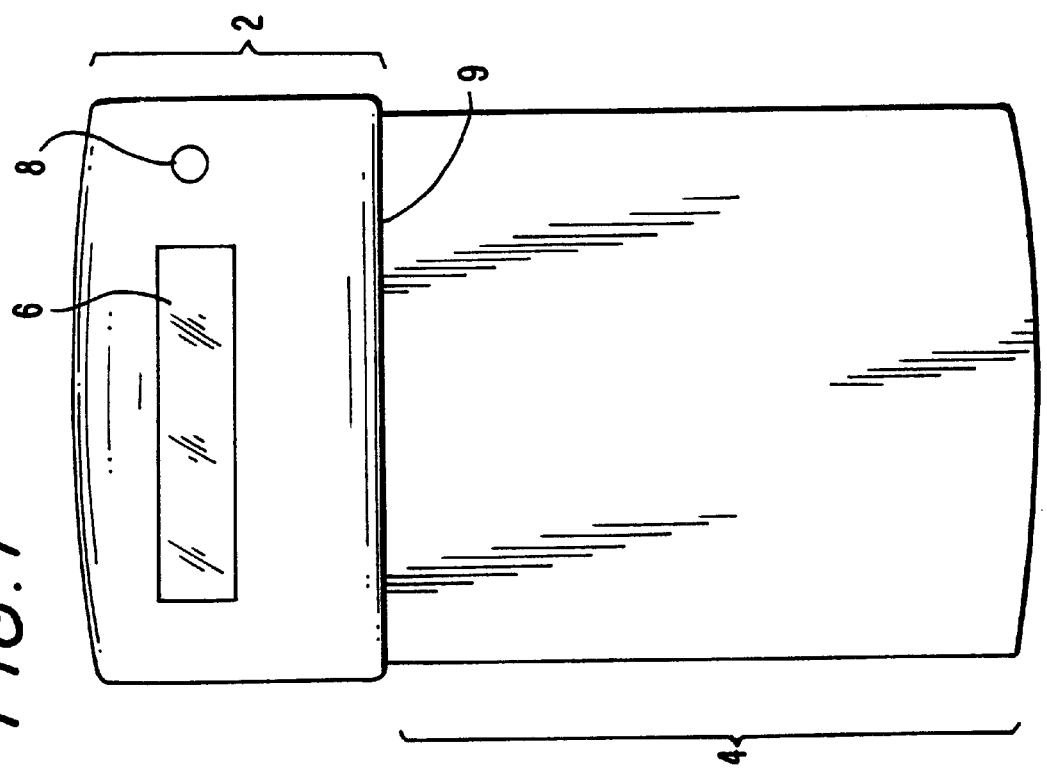

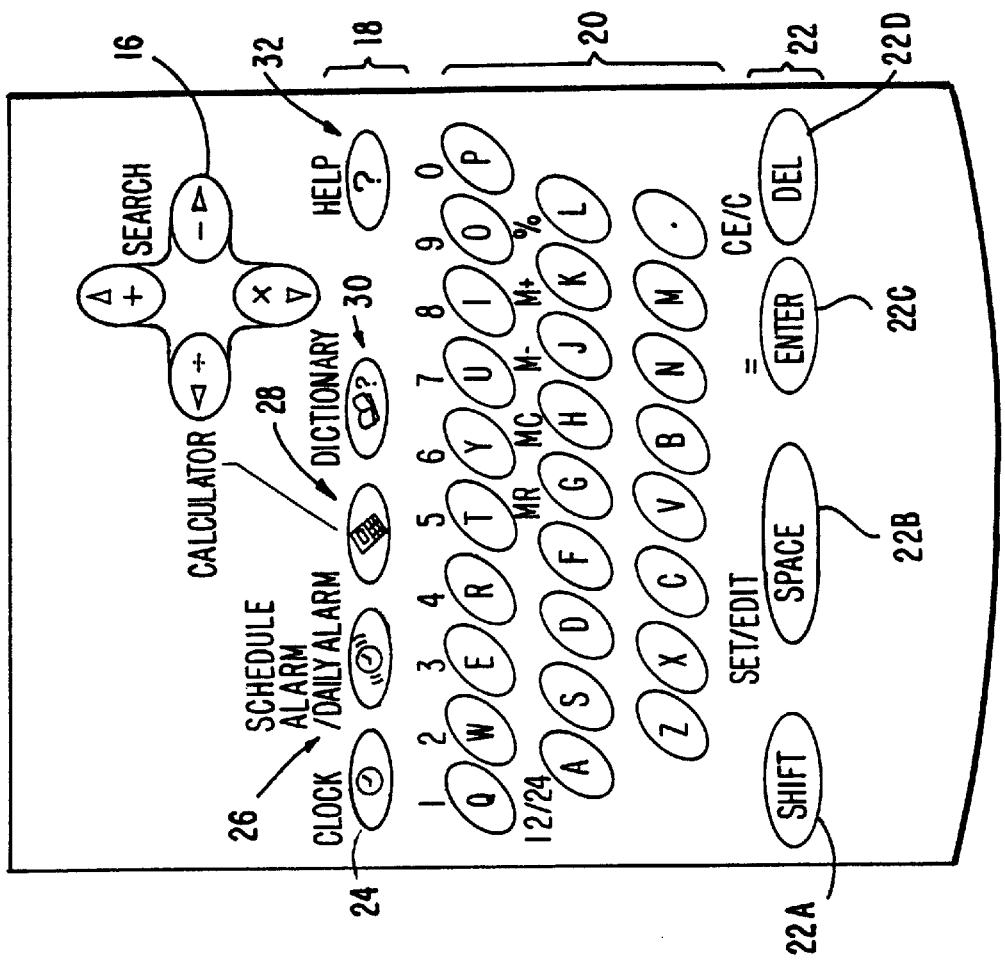
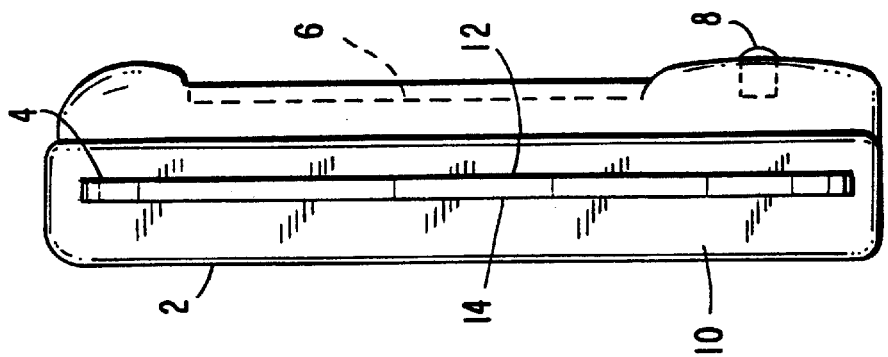

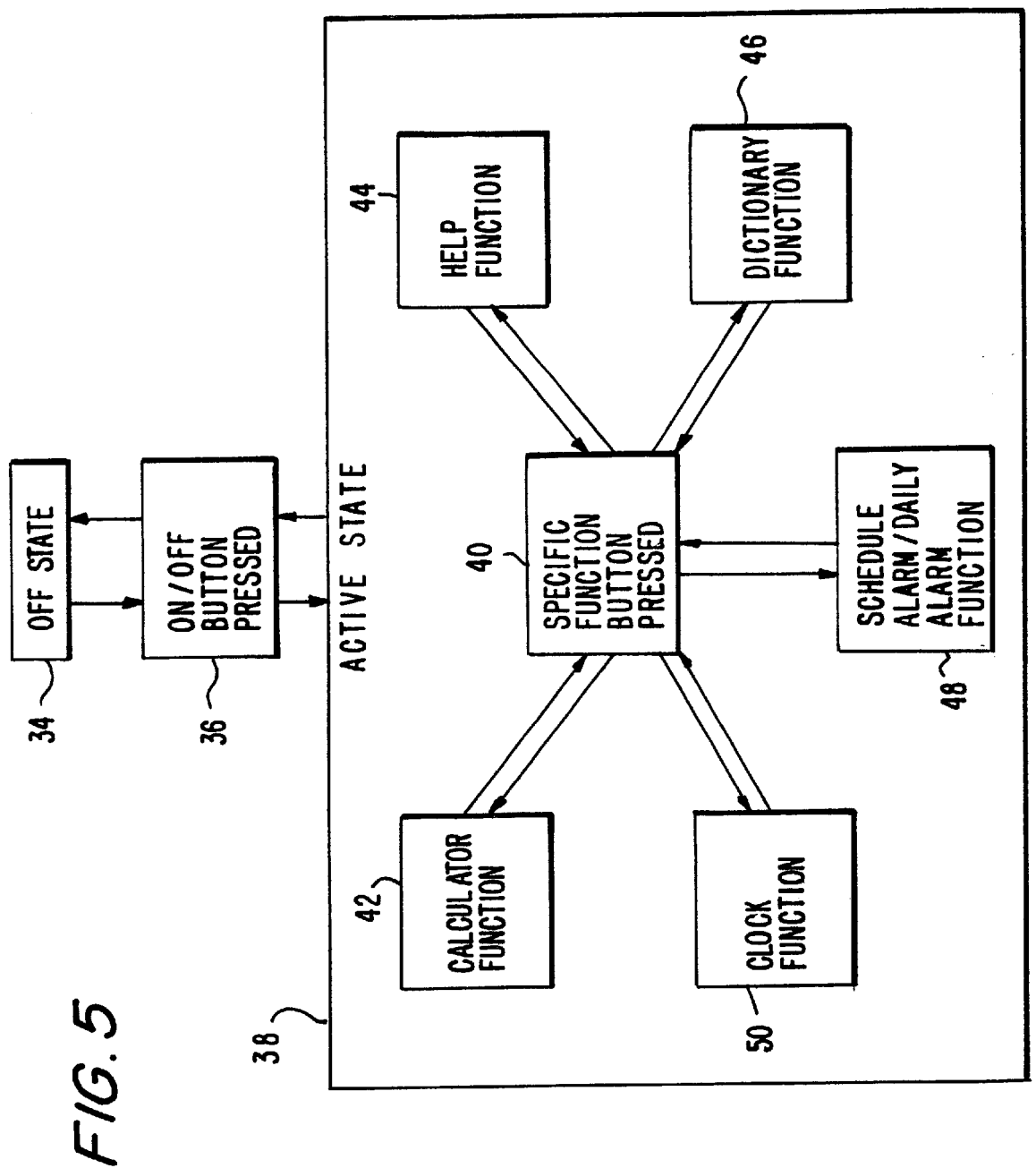

MULTIFUNCTION ELECTRONIC BOOKMARK

FIELD OF INVENTION

This invention relates to electronic devices used with a keypad to perform various functions. More specifically, the invention involves an electronic device that can perform dictionary, calculator, clock, scheduling and alarm functions and be used as a bookmark.

BACKGROUND OF THE INVENTION

The act of reading a book has long been accompanied by the desire for access to a dictionary. However, paper bound dictionaries are often unsatisfactory for the task. Due to the weight and size of a dictionary, the inconvenience of keeping the dictionary with reading material, and the length of time associated with locating particular words in the dictionary, readers have often avoided their use.

Electronic dictionaries have attempted to overcome these problems. One such device is taught in the patent to McDowell, U.S. Pat. No. 5,073,054. McDowell shows a thin electronic device capable of being placed in a book for use during reading. The device can be used to search for words using an incorporated dictionary program. Words are entered using keys attached to the device.

Unfortunately, this prior art device is lacking in several respects. While the device is intended to be a thin bookmark, the device uses keys that are raised above the device surface. Moreover, due to the generally uniform thickness of the device, there is no way to ensure that the display screen will remain visible when the device is marking a place within a closed book. Rather, the device can easily slide to be hidden within the pages of the book or even slide out of the book entirely.

BRIEF DESCRIPTION OF THE INVENTION

In view of prior art deficiencies, the principal objective of the present invention is to provide an improved electronic bookmark dictionary with a display screen that will remain visible while it marks a place in a book.

A further objective of the present invention is to provide an electronic bookmark with increased functionality.

A still further objective is to provide a keypad for an electronic bookmark that is both compact and easy to use while maintaining the necessary keys for use with the increased functionality of the device.

Additional objectives will be apparent from the description of the invention as contained herein.

In its broadest aspects, the present invention presents an improved electronic bookmark dictionary. The device utilizes a thin keypad with keys that are incorporated onto the surface of the keypad. The device has a display housing with a display screen as well. The display housing also encloses the circuitry used to control the functionality of the device and a power supply. The relative sizes and the manner in which the keypad and display are joined results in a ledge. The ledge allows the display housing to remain on the top edge of a book when the keypad is used to mark a place.

The electronic bookmark device has several functions. The device can serve as a dictionary for searching for the definitions of words that are entered at the keypad. The device also serves as a calculator and clock. The device may also be used as a scheduler/alarm to store reminders or appointments. Finally, the device also incorporates a help function to provide assistance with the use of the device itself.

To meet the requisites of this increased functionality and the minimal size necessary for a bookmark, the device utilizes a keypad with several types of keys with some keys serving dual purposes. The keypad has an array of function keys relating to the different functions of the device. The keypad also incorporates a set of alphanumeric keys, cursor or search keys and several auxiliary keys. In the preferred embodiment, each of these sets of keys are conveniently arranged on a keypad with an approximate 3.0 inch width by 3.75 inch height. The keypad also has a thickness no greater than a credit card.

BRIEF DESCRIPTION OF THE DRAWINGS

FIG. 1 depicts a front plan view of the electronic bookmark;

FIG. 2 depicts a side plan view of the electronic bookmark;

FIG. 3 depicts a bottom plan view of the electronic bookmark;

FIG. 4 shows the keyboard layout for the electronic bookmark;

FIG. 5 is a flow chart of the functionality of the electronic bookmark.

DETAILED DESCRIPTION OF THE INVENTION

The general details of the electronic bookmark device B are depicted in FIG. 1. The electronic bookmark device B has a display housing 2 and a keypad 4. The display housing 2 and the keypad 4 converge along the bottom edge 9 of the display housing 2. Electrical connections of the keypad 4 extend within the display housing 2.

Visible on the front surface of the display housing 2 are a display screen 6 and an on/off button 8. In the preferred embodiment of the device B a liquid crystal display (LCD) is used. However, any screen capable of displaying graphic and/or text characters could be used such as, for example, a display made from a light emitting polymer (LEP). The on/off button 8 is a switch used to turn the device B on and off.

The display housing 2 contains a power source as well as the electrical circuitry used to provide the functionality of the device B. In the preferred device B, the electrical circuitry incorporates a micro-controller or processor and memory store for controlling the output sent to the display screen 6, responding to input from the keypad 4 and storing the data and instruction set for the functions performed by the device B.

In FIGS. 2 and 3, the relative sizes of the display housing 2 and the keypad 4 are shown. Preferably, the keypad 4 has a uniform thickness and is sufficiently thin to fit between the pages of a book without causing harm to the binding of the book. Thus, the keypad 4 has the approximate thickness of a credit card or 0.05 inches or less.

Alternately, the display housing 4 has a thickness that is larger than the keypad 4 and is in the range of 0.3 to 1.0 inches. The display housing 2 is relatively larger in size than the keypad 4 such that an overhang or ledge 10 perpendicular to the surface of the keypad 4 is formed where the display housing 2 and keypad 4 converge. Thus, the bottom edge 9 of the display housing becomes the ledge 10. Preferably, the size of the ledge 10 created by the display housing 2 and keypad 4 is greater than 0.3 inches.

This ledge 10 serves the purpose of preventing the device B and the display screen 6 from sliding completely between the pages of a closed book or entirely sliding out of the book. To this end, when the keypad 4 is marking a place within a closed book, the ledge 10 rests on the top edge of the pages if the keypad is used like an ordinary bookmark. In this way, only the keypad 4 rests between the pages of the book.

In the preferred embodiment, the display housing 4 has a thickness of approximately 0.5 inches and the keypad 4 has a thickness of 0.03125 inches. Accordingly, the preferred embodiment of the ledge 10 is approximately 0.47 inches in width.

As depicted in FIG. 2, the keypad 4 is centrally connected along the bottom edge 9 of the display housing 2 so that the ledge 10 extends away from the front surface 12 and rear surface 14 of the keypad 4 in approximately equal amounts. Alternatively, the keypad 4 can be connected to the display housing 2 such that the ledge 10 extends away from each surface 12, 14 in unequal amounts or such that the ledge 10 only extends away from one surface 12, 14.

The details of the keypad 4 are shown in FIG. 4. Generally, the keypad has a width and height smaller than the width and height of an average page of a book. This allows the keypad 6 to be easily used to mark a page within a closed book. In addition, the keypad dimensions must be sufficient to host all the keys that are necessary for the various functions of the device B in a format that is comfortable for use. Preferably, the keypad 4 has a width in the range of 2 to 4 inches and a height in range of 3 to 5 inches. In the preferred embodiment, the keypad 4 approximately has a 3.0 inch width and 3.75 inch height.

The keypad 4 has various keys that are incorporated onto the front surface 12. This incorporation eliminates the existence of any height differential between the keys and the remainder of the front surface 12. While many potential keypad layouts exist, in the preferred embodiment, the keypad 4 has a set of cursor keys 16, an array of function keys 18, a set of alphanumeric keys 20 in a QWERTY arrangement, and a set of auxiliary keys 22. The auxiliary keys 22 include a shift key 22A, a space key 22B, an enter key 22C and a delete key 22D. Data is entered into the device B by pressing the cursor keys 16, the alphanumeric keys 20 and the auxiliary keys 22.

Several of the keys serve a secondary purpose when they are pressed in combination with the shift key 22A of the auxiliary keys 22. Alternatively, these keys may serve their secondary purpose without pressing the shift key 22A depending upon the function being performed by the device. For example, when the device B is being operated as a calculator, certain keys with calculator-related secondary purposes may be used without pressing the shift key 22A.

With regard to secondary purpose keys, the cursor keys 16 have the secondary purposes of arithmetic operator keys including addition (+), subtraction (−), division (÷) and multiplication (×). The top row of the alphanumeric keys 20, keys Q through P, function as numbers 1 through 9 and 0 respectively. In the second row of the alphanumeric keys 20, keys G through K secondarily function as memory (MR), memory clear (MC), memory minus (M−) and memory plus (M+) keys. In addition, the A key secondarily functions as a standard/military time toggle (12/24) and the L key secondarily functions as a percent sign (%). The secondary purposes with respect to the space 22B, enter 22C and delete 22D keys respectively include a set/edit function, the equal arithmetic operator (=), and clear (CE/C).

The function keys 18 are used to select the particular function of the electronic bookmark device B. The function keys include a clock key 24, a schedule alarm/daily alarm key 26, a calculator key 28, a dictionary key 30 and a help key 32. The use of these keys with respect to the functionality of the device B is more fully detailed in the flow chart of FIG. 5. Beginning in an off state 34, by pressing the button 8, step 36, the device B enters an active state 38. In the active state 38, any desired function of the device B is selected by pressing one of the function keys 18, step 40. Thus, when the calculator key 28 is pressed in step 40, the device B will function as a calculator, step 42, and data may be entered using the appropriate keys. Similarly, when the clock key 24 is pressed in step 40, the device B functions as a clock, step 50. When the help key 32 is pressed in step 40, the device B can be used as a help guide for determining how to use the device, step 44. If the dictionary key 30 is pressed, the device B functions as a dictionary, step 46, and can be used to search for the meaning of words entered with the keys of the keypad. Finally, if the schedule alarm/daily alarm key 48 is pressed, the device B functions as a scheduler/alarm, step 48, and may be used to enter reminders or appointments.

Although this invention has been described with reference to a particular embodiment, it is to be understood that this embodiment is merely illustrative of an application of the principles of the invention. Numerous modifications to the illustrative embodiment discussed herein may be made and other arrangements may be devised without departing from the spirit and scope of the invention.

I claim:

1. An electronic device for use as a bookmark comprising:
   a display housing with a text or graphic display screen;
   a keypad with a size capable of placement between the pages of a book; and
   a processor to generate output for said display screen in response to input from said keypad wherein said generation of output in response to said input performs a plurality of functions;
   wherein said display housing and said keypad are connected to form a ledge such that said ledge allows said display housing to rest on the edge of the pages of a book while said keypad is located between two pages of the book.

2. The device of claim 1 wherein said plurality of functions is a plurality of functions from a group of functions comprising: (a) a dictionary function; (b) a calculator function; (c) a clock function; (d) a scheduler function; and (e) a help function.

3. The device of claim 1 wherein said plurality of functions comprises (a) a dictionary function; (b) a calculator function; (c) a clock function; (d) a scheduler function; and (e) a help function.

4. The device of claim 1 wherein said keypad has keys incorporated onto the surface of said keypad such that said keys do not raise above said surface.

5. The device of claim 4 wherein said keys are comprised of cursor keys, a plurality of function keys, a QWERTY arrangement of alphanumeric keys and auxiliary keys wherein the top row of said alphanumeric keys relate to letters Q through P and respectively have the secondary purposes of numbers 1 through nine and 0.

6. The device of claim 1 wherein said keypad is 0.035 inches thick or less.

7. The device of claim 6 wherein said keypad is in the range of 2 to 4 inches in width and in the range 3 to 5 inches in length.

8. The device of claim 6 wherein said keypad has a width of 3 inches and a height of 3.75 inches.

9. The device of claim 1 wherein said ledge is greater than 0.3 inches.

10. An electronic device for use as a bookmark comprising:
    a display housing with a text or graphic display screen;
    a keypad with a thickness of 0.035 inches or less and capable of placement between the pages of a book with keys incorporated onto the surface of said keypad such that said keys do not raise above said surface;

a processor to generate output for said display screen in response to input from said keypad wherein said generation of output in response to said input performs a dictionary function, a calculator function, a clock function, a scheduler function and a help function;

wherein said display housing and said keypad are connected to form a ledge such that said ledge allows said display housing to rest on the edge of the pages of a book while said keypad is located between two pages of the book.

* * * * *